United States Patent
Meier et al.

(10) Patent No.: US 9,593,613 B2
(45) Date of Patent: Mar. 14, 2017

(54) RECESSED EXHAUST REDUCTANT INJECTOR WITH COVER PLATE

(71) Applicant: Cummins Emission Solutions Inc., Columbus, IN (US)

(72) Inventors: Jason Meier, Fitchburg, WI (US); Vipin Iyer, Madison, WI (US); Stephanie F. Severance, Stoughton, WI (US); Gordon Loraas, Stoughton, WI (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 0 days.

(21) Appl. No.: 14/811,556

(22) Filed: Jul. 28, 2015

(65) Prior Publication Data

US 2016/0273431 A1    Sep. 22, 2016

Related U.S. Application Data

(63) Continuation-in-part of application No. 14/660,104, filed on Mar. 17, 2015.

(51) Int. Cl.

| | |
|---|---|
| *F01N 3/00* | (2006.01) |
| *F01N 3/20* | (2006.01) |
| *B01D 53/94* | (2006.01) |
| *F01N 3/28* | (2006.01) |
| *F01N 13/00* | (2010.01) |

(52) U.S. Cl.
CPC ........... *F01N 3/2066* (2013.01); *B01D 53/94* (2013.01); *F01N 3/2892* (2013.01); *F01N 13/00* (2013.01); *F01N 13/017* (2014.06); *B01D 2258/01* (2013.01); *F01N 2610/02* (2013.01); *F01N 2610/1453* (2013.01)

(58) Field of Classification Search
CPC .................................. F01N 3/206; F01N 3/208
USPC ........................................................... 60/295
See application file for complete search history.

(56) References Cited

U.S. PATENT DOCUMENTS

| | | |
|---|---|---|
| 6,620,391 B2 | 9/2003 | Muller et al. |
| 7,908,847 B2 | 3/2011 | Crawley et al. |
| 7,958,721 B2 | 6/2011 | Craig et al. |
| 8,800,275 B2 | 8/2014 | Crandell et al. |
| 8,893,481 B2 | 11/2014 | Katou et al. |
| 8,938,954 B2 | 1/2015 | De Rudder et al. |
| 9,291,081 B2 | 3/2016 | Stanavich et al. |

(Continued)

*Primary Examiner* — Jason Shanske
(74) *Attorney, Agent, or Firm* — Foley & Lardner LLP

(57) ABSTRACT

An aftertreatment system comprises a housing defining an internal volume. The housing includes an inlet, an outlet and a first sidewall. A sleeve is positioned within the internal volume and protrudes through the first sidewall. An inner shell is positioned within an inner region defined by the sleeve and defines a recess therein. The inner shell spaced apart from the sleeve so as to define a channel therebetween. A base is positioned within the recess and includes an injection port which is in communication with the internal volume. An injector is disposed on the base and is disposed completely within the recess. The injector is in fluidic communication with the internal volume via the injection port. The injector is configured to inject an exhaust reductant into the internal volume via the opening. A cover plate can be disposed over the recess and structured to prevent objects from impacting the injector.

27 Claims, 10 Drawing Sheets

(56) References Cited

U.S. PATENT DOCUMENTS

| | | | | |
|---|---|---|---|---|
| 2010/0077710 | A1* | 4/2010 | Severance | B01D 46/002 55/495 |
| 2013/0309142 | A1* | 11/2013 | Gruber | F01N 3/2006 422/170 |
| 2014/0150840 | A1* | 6/2014 | Vitek | F01N 3/043 136/210 |
| 2014/0334987 | A1* | 11/2014 | Stanavich | F01N 3/2093 422/168 |

* cited by examiner

RECESSED EXHAUST REDUCTANT INJECTOR WITH COVER PLATE

CROSS-REFERENCE TO RELATED APPLICATIONS

This application is a continuation-in-part of U.S. patent application Ser. No. 14/660,104, filed Mar. 17, 2015 and entitled "Recessed Exhaust Reductant Injector with Cover Plate," the entire disclosure of which is incorporated herein by reference.

TECHNICAL FIELD

The present disclosure relates generally to exhaust aftertreatment systems for use with internal combustion (IC) engines.

BACKGROUND

Exhaust aftertreatment systems are used to receive and treat exhaust gas generated by engines (e.g., IC engines). Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) catalyst to convert NOx (NO and $NO_2$ in some fraction) into harmless nitrogen gas ($N_2$) and water vapor ($H_2O$) in the presence of ammonia ($NH_3$). Generally in such conventional aftertreatment systems, an exhaust reductant, (e.g., a diesel exhaust fluid such as urea) is injected into the aftertreatment system to provide a source of ammonia, and mixed with the exhaust gas to partially reduce the SOx and/or the NOx gases. The reduction byproducts of the exhaust gas are then fluidically communicated to the catalyst included in the SCR aftertreatment system to decompose substantially all of the SOx and/or NOx gases into relatively harmless byproducts which are expelled out of such conventional SCR aftertreatment systems.

The aftertreatment system includes an injector which is configured to inject the exhaust reductant into the aftertreatment system. The injector can include nozzles, valves and/or pumps or other components. The injector is configured to inject a predetermined volume of the exhaust reductant into the aftertreatment system based on operating conditions. In conventional aftertreatment systems, the injector is disposed on an outside surface of the aftertreatment system and is in fluidic communication with the aftertreatment system. In such implementations, the injector is susceptible to damage by objects striking the injector. For example, when the aftertreatment system is included in a vehicle (e.g., a diesel engine operated vehicle), an injector disposed on the exterior of the aftertreatment system included in the vehicle is susceptible to impact from rocks, debris or other objects which can damage the injector leading to malfunction of the aftertreatment system and/or degrade the performance of the aftertreatment system.

SUMMARY

Embodiments described herein relate generally to exhaust aftertreatment systems for use with IC engines, and in particular to exhaust aftertreatment systems that include an injector recessed within a housing of the aftertreatment system.

In some embodiments, an aftertreatment system comprises a housing defining an internal volume. The housing includes an inlet, an outlet and a first sidewall. A sleeve is positioned within the internal volume and protrudes through the first sidewall. An inner shell is positioned within an inner region defined by the sleeve. The inner shell defines a recess therein. The inner shell is spaced apart from the sleeve so as to define a channel therebetween. A base is positioned within the recess. The base includes an injection port which is in fluidic communication with the internal volume. An injector is disposed on the base. Moreover, the injector is disposed completely within the recess. The injector is in fluidic communication with the internal volume via the injection port. The injector is configured to inject an exhaust reductant into the internal volume via the injection port. A selective catalytic reduction system is disposed in the internal volume and structured to receive a mixture of an exhaust gas and the exhaust reductant. The selective catalytic reduction system includes at least one catalyst formulated to treat the exhaust gas.

In particular embodiments, the aftertreatment system also includes a cover plate disposed over the recess and structured to prevent objects from impacting the injector. In one embodiment, the cover plate is removably coupled to the first sidewall. In another embodiment, a plurality of openings are defined in the cover plate.

In yet another embodiment, the injector includes a base plate which is removably coupled to the base of the recess via at least one fastener. In still another embodiment, a handle is disposed on the base plate. The handle is structured to be engaged by a user to either selectively dispose the injector in the recess or selectively remove the injector from the recess. In other embodiments, the aftertreatment system can also comprise at least one of a filter, a body mixer, and an oxidation catalyst disposed within the internal volume and fluidly coupled to the selective catalytic reduction system.

In other embodiments, a housing for an aftertreatment system comprises an inlet, an outlet and a first sidewall defining a recess therein. A base is positioned within the recess. The base includes an injection port which is in fluidic communication with an internal volume defined by the housing. Furthermore, the recess is structured to receive an injector such that the injector is disposed completely within the recess and is in fluidic communication with the internal volume via the injection port. The injection port is configured to inject an exhaust reductant into the internal volume. At least a portion of the first sidewall of the housing is configured to define a dome shape.

In further embodiments, an apparatus for treating an exhaust gas comprises a housing defining an internal volume. The housing includes an inlet conduit, an outlet conduit and a first sidewall defining a recess therein. A base is positioned within the recess. The base includes an injection port which is in communication with the internal volume. An injector is disposed on the base. Moreover, the injector is disposed completely within the recess. The injector is in fluidic communication with the internal volume via the injection port. The injector is configured to inject an exhaust reductant into the internal volume via the opening. A cover plate is disposed over the recess and is structured prevent objects from impacting the injector. Each of the inlet conduit and the outlet conduit are configured to rotate relative to a longitudinal axis of the housing between a first position, in which the inlet conduit and the outlet conduit are oriented parallel to the longitudinal axis, and a second position, in which the inlet conduit and the outlet conduit are oriented perpendicular to the longitudinal axis.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
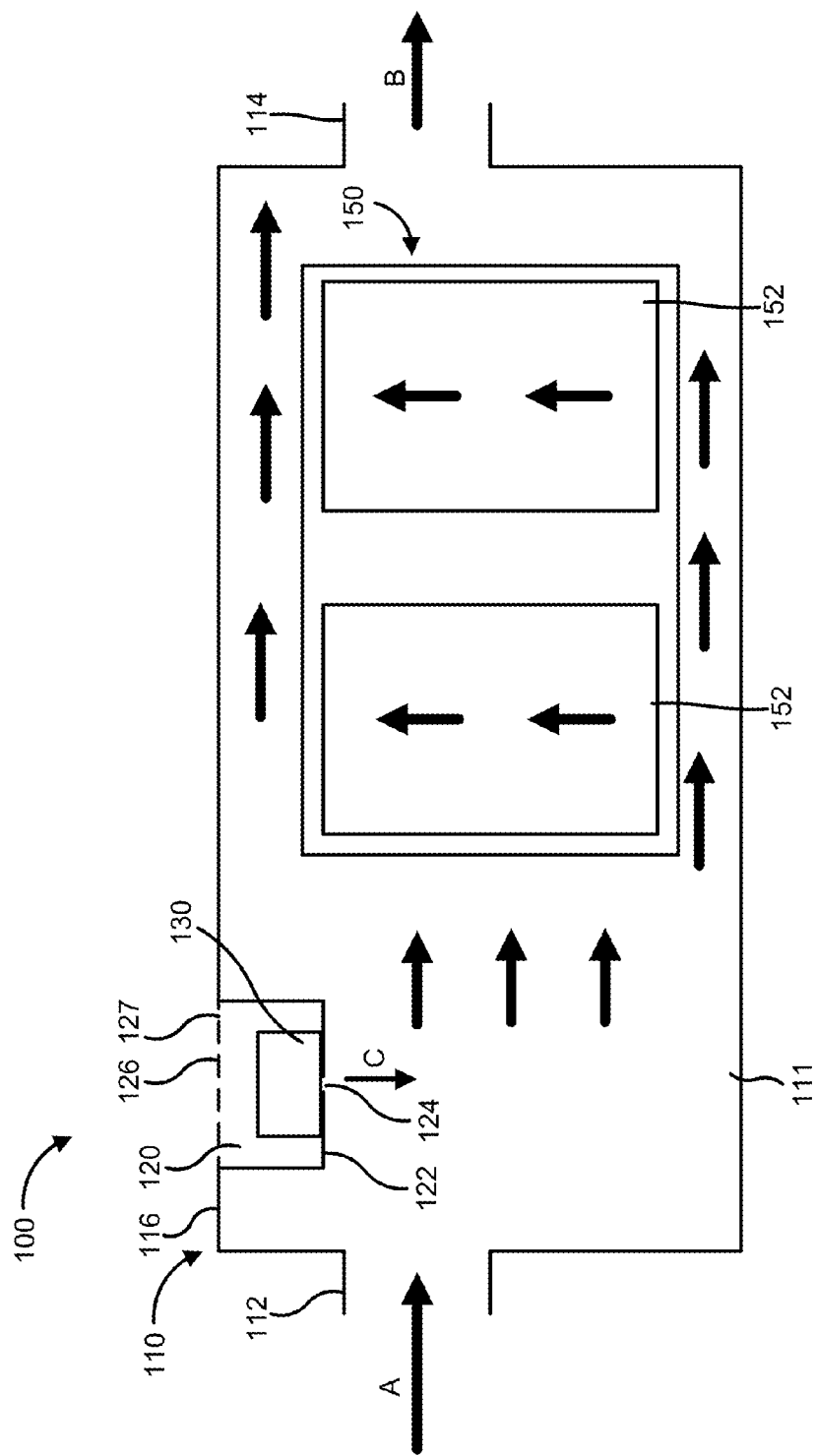
FIG. 1 is a schematic illustration of an aftertreatment system that includes a recess in which an injector is disposed, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to exhaust aftertreatment systems for use with IC engines, and in particular to exhaust aftertreatment systems that include an injector recessed within a housing of the aftertreatment system.

Embodiments described herein may provide several advantages over conventional aftertreatment systems including, for example: (1) recessing the injector within a housing of the aftertreatment system thereby protecting the injector from damage due to impacts, bumps or otherwise collisions; (2) disposing a cover plate over a recess within which the injector is disposed, which serves as a rock shield protecting the injector from impact or collision with rocks and debris; and (3) reducing the space requirement for disposing the aftertreatment system on a system such as a vehicle, thereby providing flexibility in installing the aftertreatment system and reducing cost.

FIG. 1 shows a schematic illustration of an aftertreatment system 100, according to an embodiment. The aftertreatment system 100 includes a housing 110 that defines a recess 120, an injector 130 disposed within the recess 120, and an SCR system 150 disposed within the housing 110.

The housing 110 defines an internal volume 111 within which the SCR system 150 is disposed. The housing 110 can be formed from a rigid, heat resistant, and/or corrosion resistant material. Suitable materials can include without limitation metals (e.g., stainless steel, iron, aluminum, alloys, etc.), ceramics, any other suitable material or a combination thereof. The housing 110 can define a circular, square, rectangular, polygonal, oval, or any other suitable cross section. Furthermore, the length of the housing 110 along the flow direction of the exhaust gas can be varied to increase or decrease the residence time of the exhaust gas within the housing 110.

The housing 110 includes an inlet 112 and an outlet 114. The inlet 112 is structured to receive an exhaust gas (e.g., a diesel exhaust gas) from an engine such as an IC engine (e.g., a diesel IC engine) in a direction shown by the arrow A. For example, the inlet 112 can be fixedly or removably coupled to an exhaust manifold or pipe of the engine to receive the exhaust gas. The outlet 114 is structured to expel the exhaust gas into the environment after the exhaust gas has been treated by the SCR system 150 in a direction shown by the arrow B.

The housing 110 includes a sidewall 116 that defines a recess 120 therein. As shown in FIG. 1, the recess 120 is defined proximal to the inlet 112. The recess 120 can be formed using any suitable process. For example, the housing 110 can be a casted, molded or stamped housing, and the recess 120 can be formed monolithically with the housing 110. In other embodiments, an opening can be defined on the sidewall 116 and then the recess 120 which can include a hollow cylinder can be disposed through the opening. An end of the hollow cylinder proximal to the sidewall 116 can then fixedly coupled to a rim of the opening using any suitable process, for example, welding (e.g., arc welding, gas welding, fusion bonding, etc.) thereby defining the recess 120. In this manner, the recess 120 can resemble a well within which the injector 130 can be disposed. Furthermore, the recess 120 can be formed strong and rigid materials, for example, metals.

The recess 120 can have any suitable cross-section such as, for example, circular, square, rectangular, elliptical, oval, polygonal, or any other suitable cross-section. In particular embodiments where the recess 120 has a circular cross-section, the diameter of the cross-section can vary. The depth of the recess can also vary depending upon the particular implementation.

A base 122 is positioned within the recess 120. The base 122 includes an injection port 124 which is in fluidic communication with the internal volume 111 of the housing 110. In one embodiment, the base 122 can include a plate fixedly coupled (e.g., via welding) to an end of the recess 120 distal to the sidewall 116. In other embodiments, the base 122 can be formed monolithically with the recess 120, for example, using a casting, molding, stamping, or any other suitable process. The injection port 124 can be formed by drilling or otherwise stamping a hole in the base 122. The injection port 124 therefore defines a fluidic channel between the recess 120 and the internal volume 111 of the housing 110.

An injector 130 is disposed on the base 122 such that the injector 130 is disposed completely within the recess 120. The injector 130 is in fluidic communication with the internal volume 111 via the injection port 124. The injector 130 is configured to inject an exhaust reductant into the internal volume 111 via the injection port 124 in a direction shown by the arrow C. The exhaust gas mixes with the exhaust reductant in the internal volume 111 to facilitate treatment of the exhaust gas by the SCR system 150. In some embodiments, the exhaust gas can include a diesel exhaust gas and the exhaust reductant can include a diesel exhaust fluid. The diesel exhaust fluid can include urea, an aqueous solution of urea, or any other fluid that includes ammonia, by products, or any other diesel exhaust fluid as is known in the arts (e.g., the diesel exhaust fluid marketed under the name ADBLUE®).

Expanding further, the recess 120 is dimensioned (e.g., has a diameter, width or otherwise cross-section, and depth) such that the injector 130 is disposed completely within the recess 120. In other words, the injector 130 is recessed within the housing 110. By recessing the injector 130 in the housing 110, the injector 130 can be protected from impacts, bumps, collisions or otherwise physical damage thus extending the life of the injector 130 and the thereby, the aftertreatment system 100. Furthermore, a space required by the aftertreatment system 100 for disposing on a system (e.g., a vehicle) is also reduced.

In particular embodiments, the injector 130 can include a base plate (not shown) which can be removably coupled to the base 122 via at least one fastener. For example, the base plate can be a circular plate on which the injector 130 is fixedly or removably mounted. The base plate can be disposed on the base 122 and the injector 130 can be aligned with the injection port 124. The base plate can then be fastened via fasteners (e.g., screws, nuts, bolts, etc.), for example, to corresponding threaded openings defined in the base 122. In other embodiments, a handle can also be disposed on the base plate. The handle can be structured to be engaged by a user to either selectively dispose the injector 130 in the recess 120 or selectively remove the injector 130 from the recess 120.

A cover plate 126 can optionally be disposed over the recess 120. The cover plate 126 is structured to prevent objects such as rocks or debris from impacting the injector 130. The cover plate 126 can include a strong and rigid plate, for example, a metal plate or a plastic plate. The cover plate 126 can be removably coupled to the sidewall 116 defining the recess 120. For example, the cover plate 126 can be coupled to a portion of the sidewall 116 surrounding the recess 120 by at least one fastener (e.g., screws, nuts, bolts, etc.). In other embodiments, the cover plate 126 can be removably coupled to the sidewall 116 using a snap-fit mechanism.

A plurality of openings 127 can be defined in the cover plate 126. The plurality of openings 127 can include, for example, slits, circular openings, square openings, rectangular openings, or have any other shape or otherwise cross-section. The plurality of openings 127 allow air to be communicated into the recess 120. This allows heat to escape from the recess 120 which would otherwise be trapped within the recess 120 if the cover plate 126 does not include the plurality of openings 127. In some embodiments, the plurality of openings 127 can include circular openings having a diameter structured to prevent rocks having a predetermined cross-section from passing through the openings 127 and impacting the injector 130.

The SCR system 150 is disposed in the internal volume 111 and is structured to receive a mixture of the exhaust gas (e.g., a diesel exhaust gas) and the exhaust reductant (e.g., a diesel exhaust fluid). The SCR system 150 includes at least one catalyst 152 formulated to treat the exhaust gas. The exhaust reductant reacts with the exhaust gas to at least partially reduce one or more components of the gas (e.g., SOx and NOx), or facilitate reduction of the one or more components in the presence of the one or more catalysts 152.

The catalysts 152 can include any suitable catalyst such as, for example, platinum, palladium, rhodium, cerium, iron, manganese, copper, vanadium based catalyst, any other suitable catalyst, or a combination thereof. The catalysts 152 can be disposed on a suitable substrate such as, for example, a ceramic (e.g., cordierite) or metallic (e.g., kanthal) monolith core which can, for example, define a honeycomb structure. A washcoat can also be used as a carrier material for the catalysts 152. Such washcoat materials can include, for example, aluminum oxide, titanium dioxide, silicon dioxide, any other suitable washcoat material, or a combination thereof. The exhaust gas (e.g., diesel exhaust gas) can flow over and about the catalysts 152 such that any SOx and/or NOx gases included in the exhaust gas are further reduced to yield an exhaust gas which is substantially free of carbon monoxide, SOx and NOx gases.

As shown in FIG. 1, the SCR system 150 is disposed downstream of the recess 120. This allows the exhaust gas and the exhaust reductant to mix sufficiently in a portion of the internal volume upstream of the SCR system 150 before entering the SCR system 150. In particular embodiments, the internal volume 111 can be divided into a plurality of portions. For example, the internal volume 111 can be divided into a first portion proximal to the recess 120, and a second portion distal to the recess 120 within which the SCR system 150 can be disposed. The first portion and the second portion can be divided by a partition which can define an opening, a channel or a passageway so as to allow the exhaust gas and exhaust reductant mixture to flow from the first portion into the second portion. The first portion can be structured to allow the exhaust gas to sufficiently mix with the exhaust reductant to form a mixture which is then communicated to the SCR system 150.

In other embodiments, the aftertreatment system 100 can also include additional components, for example, a filter, a body mixer and/or an oxidation catalyst configured to facilitate treatment of the exhaust gas. Each of these components can be disposed in the internal volume 111 and fluidly coupled to the SCR system 150. For example, the filter can be disposed upstream of the SCR system 150 and can include any suitable filter (e.g., a diesel particulate filter) configured to filter and remove any particulates entrained within the exhaust gas flow to prevent such particulates from entering the SCR system 150. Such particles can include, for example, dust, soot, organic particles, crystals, or any other solid particulates present in the exhaust gas.

The body mixer can be structured to allow efficient mixing of the exhaust reductant with the exhaust gas before communicating the exhaust gas into the SCR system 150. The body mixture can be disposed upstream of the SCR system 150 (e.g., in the first portion of the internal volume 111, as described herein). The body mixer can include any suitable structures such as, for example, passageways, bluffs, vanes, partition walls, or any other features or structures to facilitate the mixing of the exhaust reductant with the exhaust gas.

The diesel oxidation catalyst can be disposed upstream or downstream of the SCR system 150. The diesel oxidation catalyst can be formulated to oxidize carbon monoxide, hydrocarbons, and/or particulate matter included in the exhaust gas flow. Moreover, the diesel oxidation catalyst can be formulated to have a low light-off temperature and/or a high tolerance to sulfur (e.g., SOx gases included in the exhaust gas). Suitable diesel oxidation catalysts can include, for example, platinum, palladium, aluminum oxide, or a combination thereof.

Figure 2:
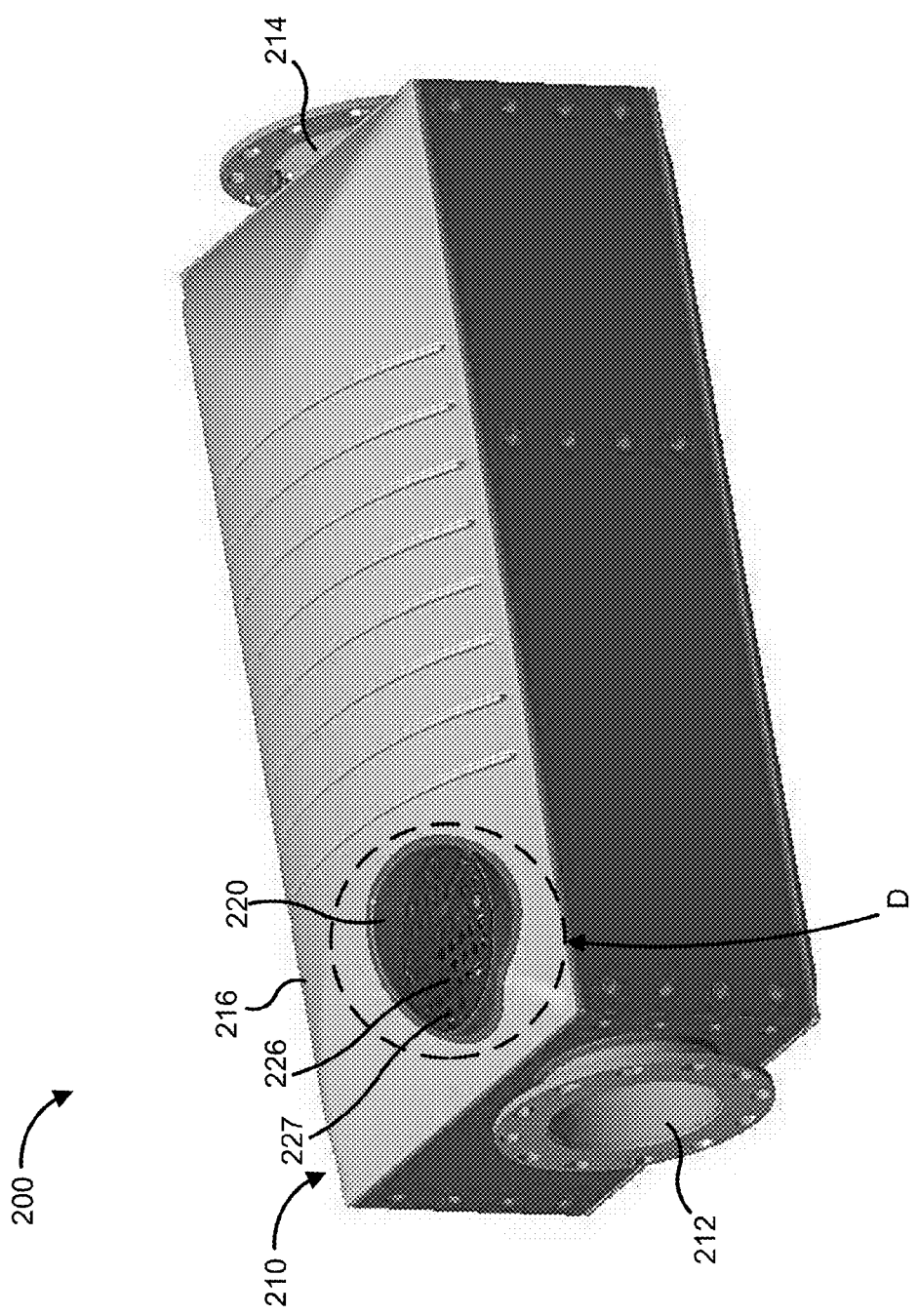
FIG. 2 is a perspective view of another embodiment of an aftertreatment system that includes a recess within which an injector is disposed.

FIG. 2 shows a perspective view of an exemplary aftertreatment system 200 that includes an injector 230 disposed within a recess 220 defined in a housing 210 of the aftertreatment system 200. The aftertreatment system 200 is structured to receive an exhaust gas (e.g., a diesel exhaust gas) from an engine (e.g., a diesel engine) and treat the exhaust gas.

The housing 210 defines an internal volume within which an SCR system (e.g., the SCR system 150 is disposed). Additional components such as a filter, body mixer and/or a diesel oxidation catalyst, as described with respect to the aftertreatment system 100, can also be disposed within the housing 210. The housing 210 can be formed from a rigid, heat resistant, and/or corrosion resistant material. Suitable materials can include without limitation metals (e.g., stainless steel, iron, aluminum, alloys, etc.), ceramics, any other suitable material or a combination thereof. The length of the housing 210 along the flow direction of the exhaust gas can be varied to increase or decrease the residence time of the exhaust gas within the housing 210.

The housing 210 includes an inlet 212 and an outlet 214. The inlet 212 is structured to receive an exhaust gas (e.g., a diesel exhaust gas) from an engine such as an IC engine (e.g., a diesel IC engine). The inlet 212 can be removably coupled to a first exhaust manifold or pipe (e.g., via fasteners such as screws, nuts, bolts, etc.) of an engine to receive the exhaust gas. The outlet 214 is structured to expel the exhaust gas into the environment after being treated by the SCR system disposed in the internal volume. The outlet 214 can also be removably coupled to a second exhaust pipe (e.g., via fasteners such as screws, nuts, bolts, etc.) structured to expel the treated exhaust gas to the environment.

Figure 3:
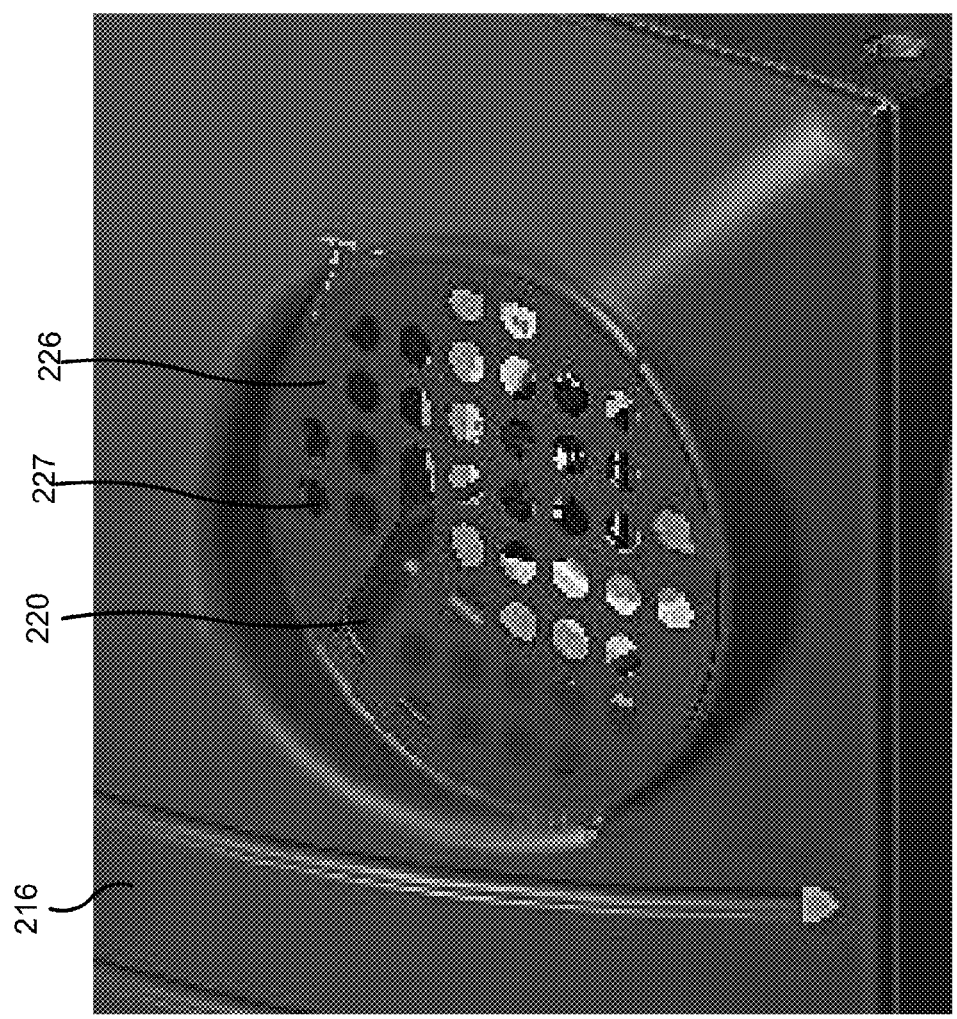
FIG. 3 shows an enlarged view of a portion of the aftertreatment system of FIG. 2 shown by the arrow D showing the recess with a cover plate disposed on the recess.
Figure 4:
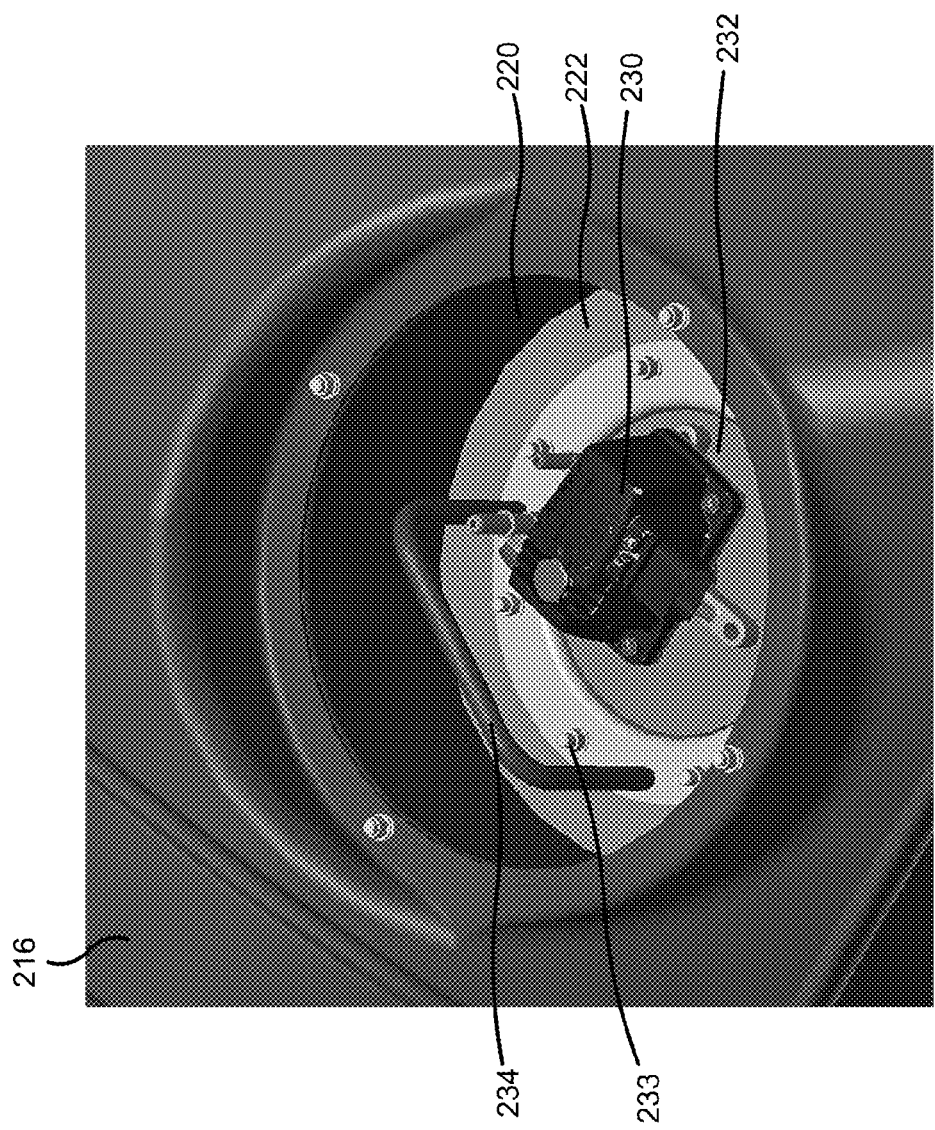
FIG. 4 shows the enlarged view of FIG. 3 with the cover plate removed showing the injector disposed on a base of the recess.

The housing 210 includes a sidewall 216 that defines a recess 220 therein. The recess 220 is defined proximal to the inlet 212. FIG. 3 shows an enlarged view of a portion of the housing 210 shown by the arrow D which includes the recess 220. As shown in FIG. 3, a cover plate 226 is disposed over the recess 220. FIG. 4 shows the portion of the housing 210 of FIG. 3 with the cover plate 226 removed. The cover plate 226 is structured to prevent objects from impacting the injector 230 disposed in the recess 220 (see FIG. 4). The cover plate 226 can include a strong and rigid plate, for example, a metal plate or a plastic plate. The cover plate 226 is removably coupled to the sidewall 216 defining the recess 220. The cover plate 226 can be removably coupled to a portion of the sidewall 216 surrounding the recess 220 by at least one fastener (e.g., screws, nuts, bolts, etc.). In other embodiments, the cover plate 226 can be removably coupled to the sidewall 216 using a snap-fit mechanism.

A plurality of openings 227 are defined in the cover plate 226. As shown in FIGS. 2-3, the plurality of openings 227 include a circular openings. The plurality of openings 227 are structured to allow air to be communicated into the recess 220 thus enabling heat to escape from the recess 220 which would otherwise be trapped within the recess 220. This trapped heat can negatively influence the performance of the injector 230. Moreover, the plurality of openings 227 can have a diameter structured to prevent rocks, debris or other objects having a predetermined cross-section from passing through the openings 227 and impacting the injector 230.

The recess 220 can be formed using any suitable process. For example, the housing 210 can be a casted housing 210 and the recess 220 can be formed monolithically with the housing 210. In other embodiments, an opening can be defined on the sidewall 216 and then a hollow cylinder can be disposed through the opening. An end of the hollow cylinder proximal to the sidewall 216 is coupled to a rim of the opening using any suitable process, for example, welding (e.g., arc welding, gas welding, fusion bonding, etc.), or via fasteners (e.g., screws, nuts, bolts, rivets, etc.) thereby defining the recess 220.

As shown in FIG. 4, the recess 220 has a circular cross-section. The diameter and depth of the recess 220 are defined such that the injector 230 is disposed completely within the recess 220. In other words, no portion of the injector 230 protrudes beyond a surface of the sidewall 216.

A base 222 is positioned within the recess 220. The base 222 includes an injection port (not shown) which is in fluidic communication with the internal volume of the housing 210. In one embodiments, the base 222 can include a plate fixedly coupled (e.g., via welding) to an end of the recess 220 distal to the sidewall 216. In other embodiments, the base 222 can be formed monolithically with the recess 220, for example, using a casting, molding, stamping process, or any other suitable process.

The injector 230 is disposed on the base 222 such that the injector 230 is disposed completely within the recess 220, as described herein. The injector 230 is in fluidic communication with the internal volume defined by the housing 210 via the injection port. The injector 230 is configured to inject an exhaust reductant into the internal volume via the injection port. The exhaust gas is mixed with the exhaust reductant in the internal volume to facilitate treatment of the exhaust gas by the SCR system. In some embodiments, the exhaust gas can include a diesel exhaust gas and the exhaust reductant can include a diesel exhaust fluid (as described with respect to the aftertreatment system 100).

The injector 230 includes a circular base plate 232 which is removably coupled to the base 222 via a plurality of fasteners (e.g., nuts, bolts, screws, etc.). The injector 230 can be fixedly mounted on the base plate 232. The base plate 232 can be disposed on the base 222 and the injector 230 can be aligned with the injection port. The base plate 232 can then be mounted via the fasteners 233, for example, to corresponding threaded openings defined on the base 222. A handle 234 is also disposed on the base plate 232. The handle 234 is structured to be engaged by a user to either selectively dispose the injector 230 in the recess 220 or selectively remove the injector 230 from the recess 220. This allows replacement of the injector 230 in case of malfunction without replacing the entire aftertreatment system 200.

Figure 5A:
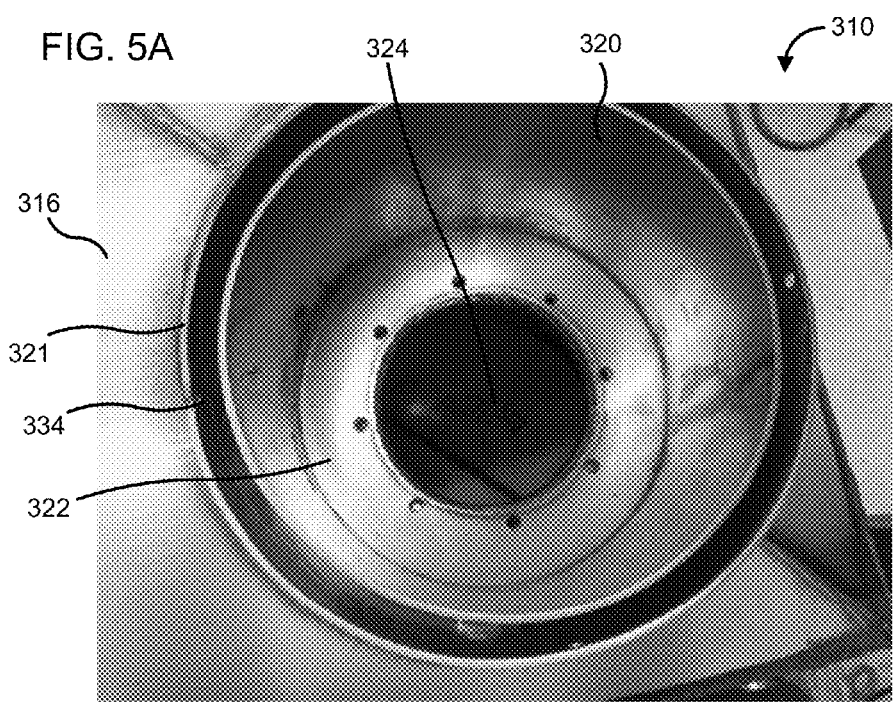
FIG. 5A is a top view of a portion of another embodiment of a housing of an aftertreatment system showing a sleeve positioned within an internal volume of the housing and protruding through a first sidewall of the housing, and an inner shell which defines a recess positioned within an inner region defined by the sleeve to define a channel therebetween.
Figure 5B:
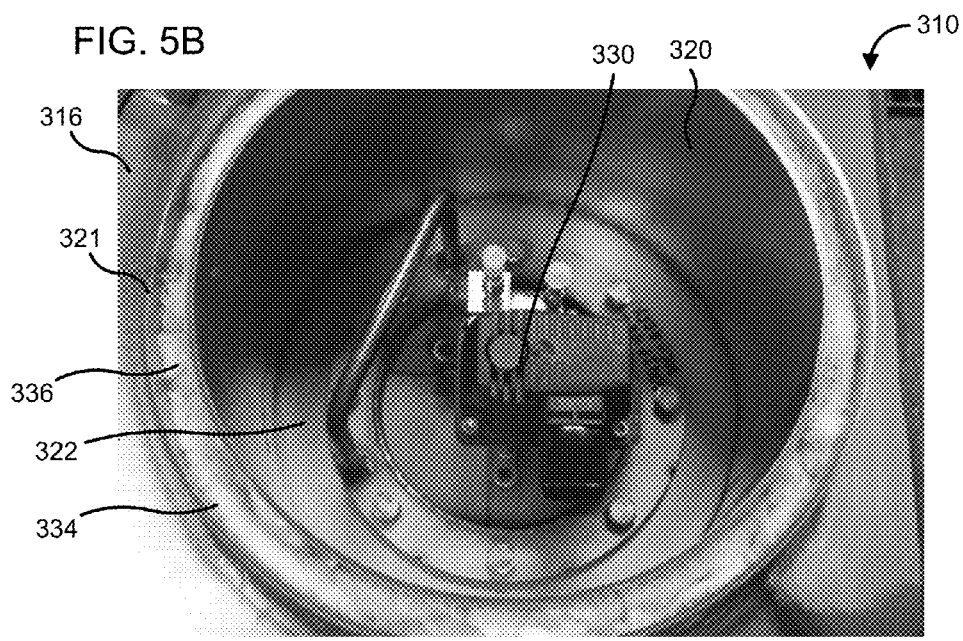
FIG. 5B shows an insulating material positioned in the channel.

FIGS. 5A and 5B are a top view of a portion of a housing 310 defining an internal volume which can be included in an aftertreatment system, for example the aftertreatment system 100. The housing 310 includes a first sidewall 316. A sleeve 321 is positioned within the internal volume of the housing 310 and protrudes through the first sidewall 316. For example, an opening or cavity can be defined (e.g., cut out or stamped) in the first sidewall 316 and the sleeve 321 can be inserted therethrough to be positioned within the internal volume of the housing 310 such that a portion of the sleeve 321 protrudes through the first sidewall 316.

In various embodiments, the sleeve 321 can be fixedly coupled to the first sidewall 316. For example, an outer peripheral surface of the sleeve 321, which is in contact with the edge of the opening or cavity defined in the first sidewall 316, can be welded or otherwise fixedly adhered to the edge of the opening or cavity, thereby fixedly securing the sleeve 321 therein.

An inner shell 320 is positioned within an inner region defined by the sleeve 321. The inner shell 320 defines a recess therein. The inner shell 320 is spaced apart from the sleeve 321 so as to define a channel 334 therebetween. In particular embodiments, the inner shell 320 is double walled so that the channel 334 is defined between the walls of the recess 320. In such embodiments, the sleeve 321 can be excluded. The channel 334 is configured to limit radiant and conductive heat transfer from the aftertreatment system to the injector 330, thereby protecting the injector 330 from excessive heat which can damage the injector 330.

In particular embodiments, an insulating material 336, for example polystyrene, glass wool or any other suitable insulating material, is positioned within the channel 334. The insulating material 336 may further limit conductive and radiant heat transfer from the aftertreatment system to the injector 330 and provide further protection to the injector 330 from the heat generated by the aftertreatment system.

In still other embodiments, a liquid coolant is provided or communicated into the channel 334. For example, the channel 334 may be fluidly coupled to a cooling system or coolant circulation system of an apparatus (e.g., a vehicle) which includes the aftertreatment system having the housing 310. The channel 334 can be provided with cooling lines or coolant may be directly pumped into the space 334 e.g., via openings defined in the sleeve 321. The coolant provides heat transfer drawing the heat generated by the aftertreatment system away from the recess 320 and thereby the injector 330.

A base 322 is positioned within the recess 320. An injection port 324 is defined in the base 322 which is in fluidic communication with an internal volume defined by the housing 310. The base 322 can include a plate fixedly coupled (e.g., via welding) to an end of the recess 320 distal to the first sidewall 316, or be monolithically formed with the recess 320, for example using a casting, molding, stamping or any other suitable process. The injection port 324 can be formed by drilling or stamping a hole in the base 322. In this manner, the injection port 324 defines a fluidic channel between the base 322 and the internal volume of the housing 310.

An injector 330 can be positioned on the base 322 such that the injector 330 is positioned completely within the recess 320, as shown in FIG. 5B. The injector 330 is in fluidic communication with the internal volume via the injection port 324. The injector 330 can be substantially similar to the injector 130 or 230 as described with respect to the aftertreatment system 100 and 200.

Figure 6:
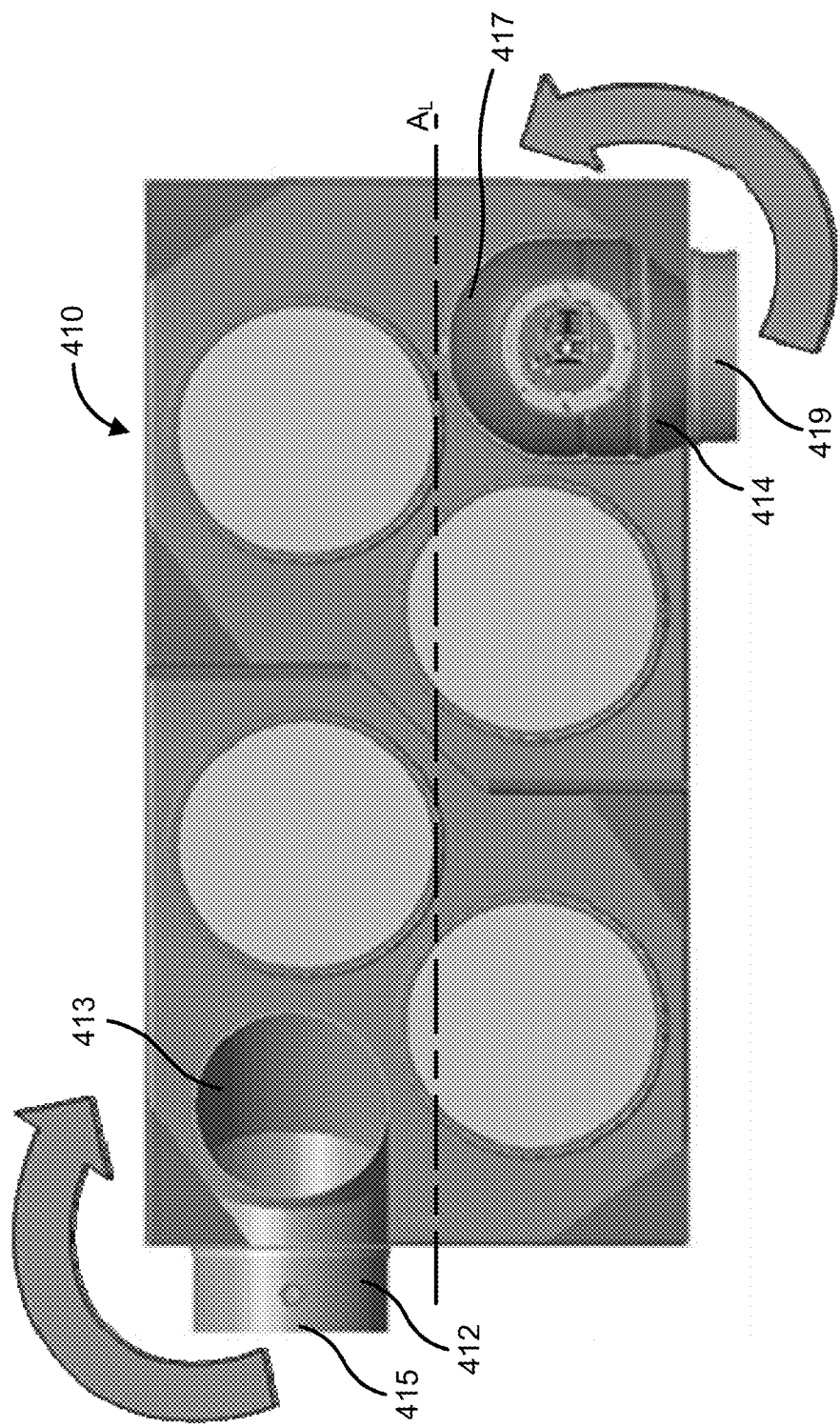
FIG. 6 is a bottom cross-sectional view of yet another embodiment of a housing of an aftertreatment system that includes an inlet conduit and outlet conduit that are configured to rotate relative to a longitudinal axis of the housing.

In particular embodiments, a housing of an aftertreatment system can include an outlet and an outlet that can be rotated relative to a longitudinal axis of the housing to reposition the inlet and outlet, thereby allowing flexibility in mounting the housing on a structure. For example, FIG. 6 is a bottom cross-section view of a housing 410 of an aftertreatment system (e.g., the aftertreatment system 100). The housing 410 includes an inlet conduit 412 and an outlet conduit 414.

Each of the inlet conduit 412 and the outlet conduit 414 are rotatably mounted within the housing 410. For example, the inlet conduit 412 and/or the outlet conduit 414 can be pivotally mounted, mounted on bearings, friction fitted or snap-fitted into a sleeve or a flange positioned within the housing 410 such that the inlet conduit 412 and the outlet conduit 414 can rotate relative to the housing 410. In various implementations, the inlet conduit 412 and/or the second outlet 414 are configured to rotate relative to a longitudinal axis $A_L$ of the housing 410 between a first position in which the inlet conduit 412 and the outlet conduit 414 are oriented parallel to the longitudinal axis $A_L$, and a second position in which the inlet conduit 412 and the outlet conduit 414 are oriented perpendicular to the longitudinal axis $A_L$. For example, the inlet conduit 412 and the outlet conduit 414 can be rotated by an angle of 90 degrees, 85 degrees, 80 degrees, 75 degrees, 70 degrees, 65 degrees or 60 degrees inclusive of all ranges and values therebetween.

Expanding further, the inlet conduit 412 includes an inlet conduit first end 413 positioned within the housing 410 (e.g., within an internal volume of the housing or within a notch, groove or crevice defined in the housing 410) and an inlet conduit second end 415 positioned outside the housing 410 as shown in FIG. 6. The inlet conduit first end 413 is rotatably mounted within the housing 410 such that the inlet conduit second end 415 is rotatable about the inlet conduit first end 413 to orient the inlet conduit 412 between the first position, in which the inlet conduit 412 is oriented parallel to the longitudinal axis $A_L$ as shown in FIG. 6, and the second position, in which the inlet conduit 412 is oriented perpendicular to the longitudinal axis $A_L$.

Similarly, the outlet conduit 414 includes an outlet conduit first end 417 positioned within the housing 410 (e.g., within an internal volume of the housing or within a notch, groove or crevice defined in the housing 410) and an outlet conduit second end 419 positioned outside the housing 410 as shown in FIG. 6. The outlet conduit first end 417 is rotatably mounted within the housing 410 such that the outlet conduit second end 419 is rotatable about the outlet conduit first end 417 to orient the outlet conduit 414 between the first position, in which the outlet conduit 414 is oriented parallel to the longitudinal axis $A_L$, and the second configuration, in which the outlet conduit 414 is oriented perpendicular to the longitudinal axis $A_L$, as shown in FIG. 6. Flexibility in orienting the inlet conduit 412 and the outlet conduit 414 allows orienting the inlet conduit 412 and outlet conduit 414 in various orientations with minimal changes to the overall housing 410, thereby providing compatibility with various aftertreatment system designs.

Figure 7A:
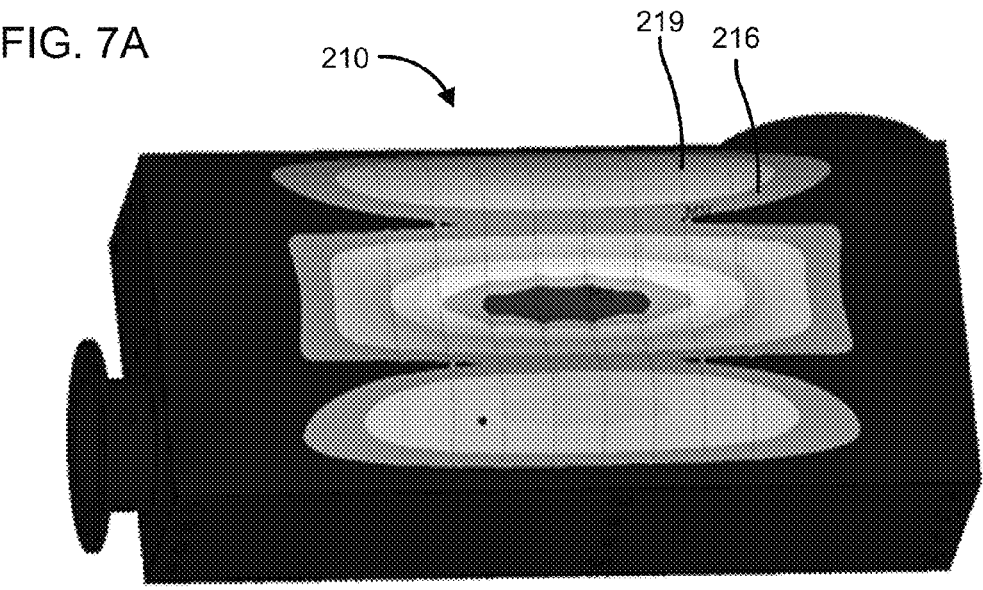
FIG. 7A is a finite element model (FEM) of the dome shaped housing of the aftertreatment system of FIG. 2 showing stress distribution.
Figure 7B:
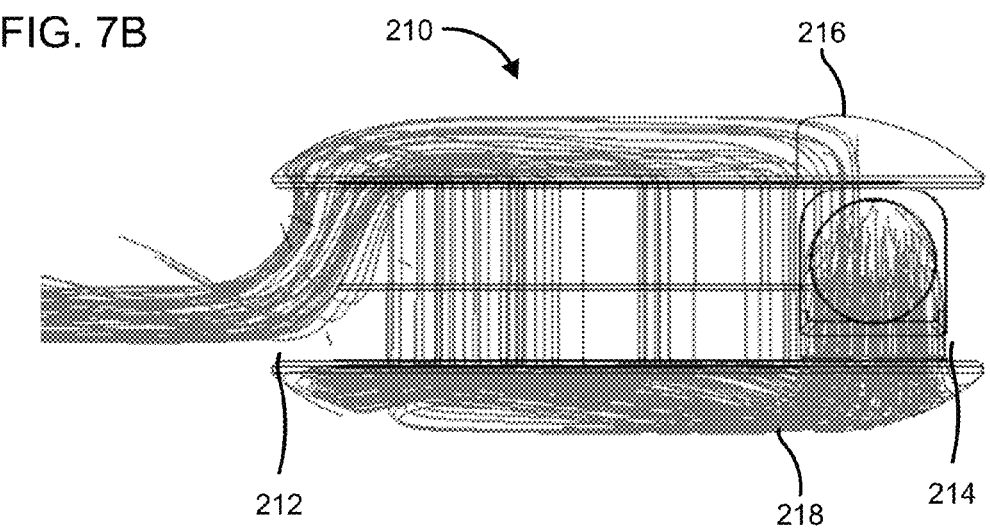
FIG. 7B is a FEM model of flow path of an exhaust gas flowing through the dome shaped housing.

As shown in FIG. 2, the sidewall 216 or first sidewall 216 of the housing 210 is curved or contoured such that at least a portion of the first sidewall 216 and, thereby the housing 210 defines a dome shape. The dome shape of the first sidewall 216 provides aerodynamic redirection of the exhaust gas flowing into the internal volume defined by the housing 210 from the inlet 212 towards the outlet 214. FIG. 7B shows FEM analysis of exhaust gas flow profile through the internal volume defined by the housing 210. At least a portion of the first sidewall 216 is curved or contoured to define a dome shape which redirects the exhaust gas flow from the inlet 214 towards the outlet 214. The flow redirection can reduce backpressure which can reduce reductant deposits, reduce space occupied by the housing 210 as well as enhance structural strength and durability of the housing 210, relative to an aftertreatment housing that does not include such features.

A second sidewall 218 of the housing 210 opposite the first sidewall 216 can also be curved or contoured such that at least a portion of the second sidewall 218 also defines the dome shape. This can further facilitate redirection of the exhaust gas from the inlet 212 towards the outlet 214. Furthermore, the dome shape of the housing 210 can distribute high stress and minimize deformation which can occur, for example due to exhaust gas backpressure pulses or random vibration experienced by the housing 210 during operation. FIG. 7A shows a FEM analysis of stress distribution along the dome shaped first sidewall 216.

In particular embodiments, a plurality of ribs 219 can also be disposed on the first sidewall 216 to increase structural rigidity of the housing 210 (e.g., by increasing stiffness of the first sidewall 216). For example, the ribs 219 can be fixedly coupled (e.g., welded) to the first sidewall 216 or defined monolithically with the first sidewall 216. The plurality of ribs 219 can be oriented parallel to a longitudinal axis of the housing 210, perpendicular or orthogonal to the longitudinal axis, at an angle with respect to the longitudinal axis, any other orientation or a combination thereof.

Figure 8:
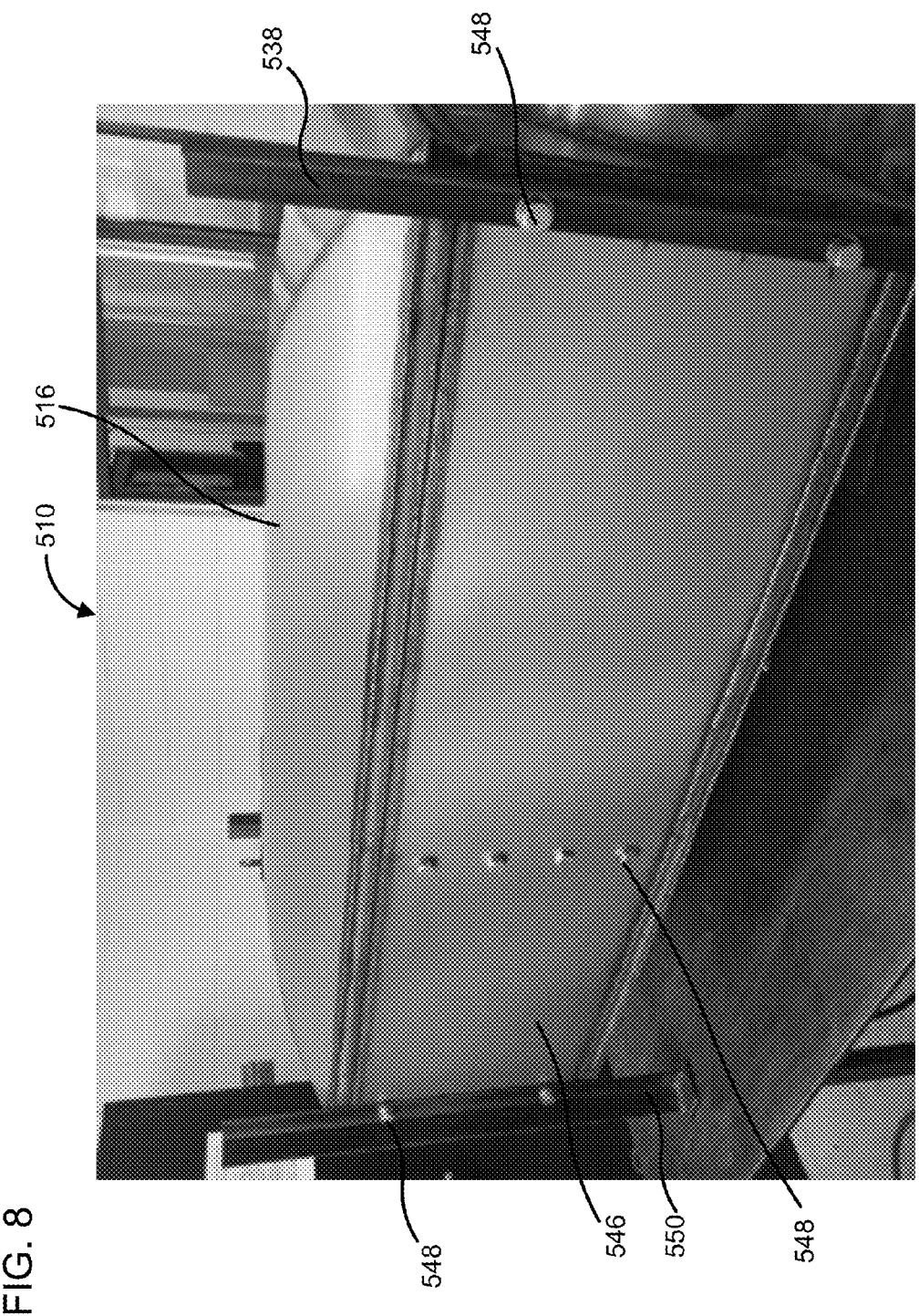
FIG. 8 is a perspective view of still another embodiment of a housing of an aftertreatment system which includes a plurality of mounting holes defines on a second sidewall of the housing positioned orthogonal to a first sidewall of the housing defining a recess therein. The mounting holes are configured to receive fasteners to allow flexible mounting of the housing on a structure.

In still other embodiments, a housing of an aftertreatment system can be configured to incorporate mounting structures within the housing. FIG. 8 shows a housing 510 which can be included in an aftertreatment system (e.g., the aftertreatment system 100). The housing 510 includes a first sidewall 516, a second sidewall 546 and a third sidewall (not shown) positioned opposite the second sidewall 546. Each of the second sidewall 546 and the third sidewall are oriented orthogonal to the dome shaped first sidewall 516 of the housing 510. In some embodiments, a recess (e.g., the recess 220 or 320 as described before herein) can be defined in the dome shaped sidewall 516.

A plurality of mounting holes are defined on the second sidewall 546 of the housing 510. A plurality of mounting holes can also be defined on the third sidewall. For example, the plurality of mounting holes can be drilled or tapped into the second sidewall 546 and/or the third sidewall of the housing 510. Each mounting hole of the plurality of mounting holes is configured to receive a fastener 548 (e.g., a bolt, a screw, a pin, a rivet, etc.) for mounting the housing 510 on a structure. For example, threads can be defined within each of the plurality of mounting holes to allow the fasteners 548 to be removably coupled to the mounting holes.

FIG. 8 shows a fastener 548 (e.g., a bolt) inserted into each of the plurality of mounting holes defined on the second sidewall 546 of the housing 510. The housing 510 is mounted on mounting legs 550 via a portion of the fasteners 548. Similarly, the mounting supports and the fasteners 548 can be used to mount the housing 510 on any structure. In this manner, the housing 510 can be directly mounted on a structure (e.g., a vehicle chassis) without brackets, straps, clamps, and/or frames. In particular embodiments, the second sidewall 546 and/or the third sidewall can be reinforced with an internal frame (not shown) to provide additional structural rigidity to the housing 510 during mounting.

In various embodiments, a housing for a catalyst system, for example an oxidation catalyst system (e.g., a diesel oxidation catalyst system or an ammonia oxidation catalyst system) or a SCR system, can include a one or more catalyst substrate cans positioned within openings defined in a plate (e.g., a flat plate) which is positioned within an internal volume defined by the housing of the catalyst assembly. High exhaust gas temperatures, severe shock and vibrations experienced by the catalyst system during operation cause significant stress in the catalyst substrate cans and the plate within which the substrate cans are positioned, particularly at the rim of the openings defined in the plate. The stress increases the probability of cracking and subsequent failure of the catalyst system.

To reduce the stress and provide mechanical strength, stiffness and rigidity to the plate and the catalyst assembly, strengthening rings are positioned about an outer perimeter of the catalyst substrate cans at a portion of the catalyst substrate can proximal to the flat plate. The strengthening rings are fixedly coupled to each of the plate and the substrate cans, thereby providing mechanical and structural strength reducing.

Figure 9:
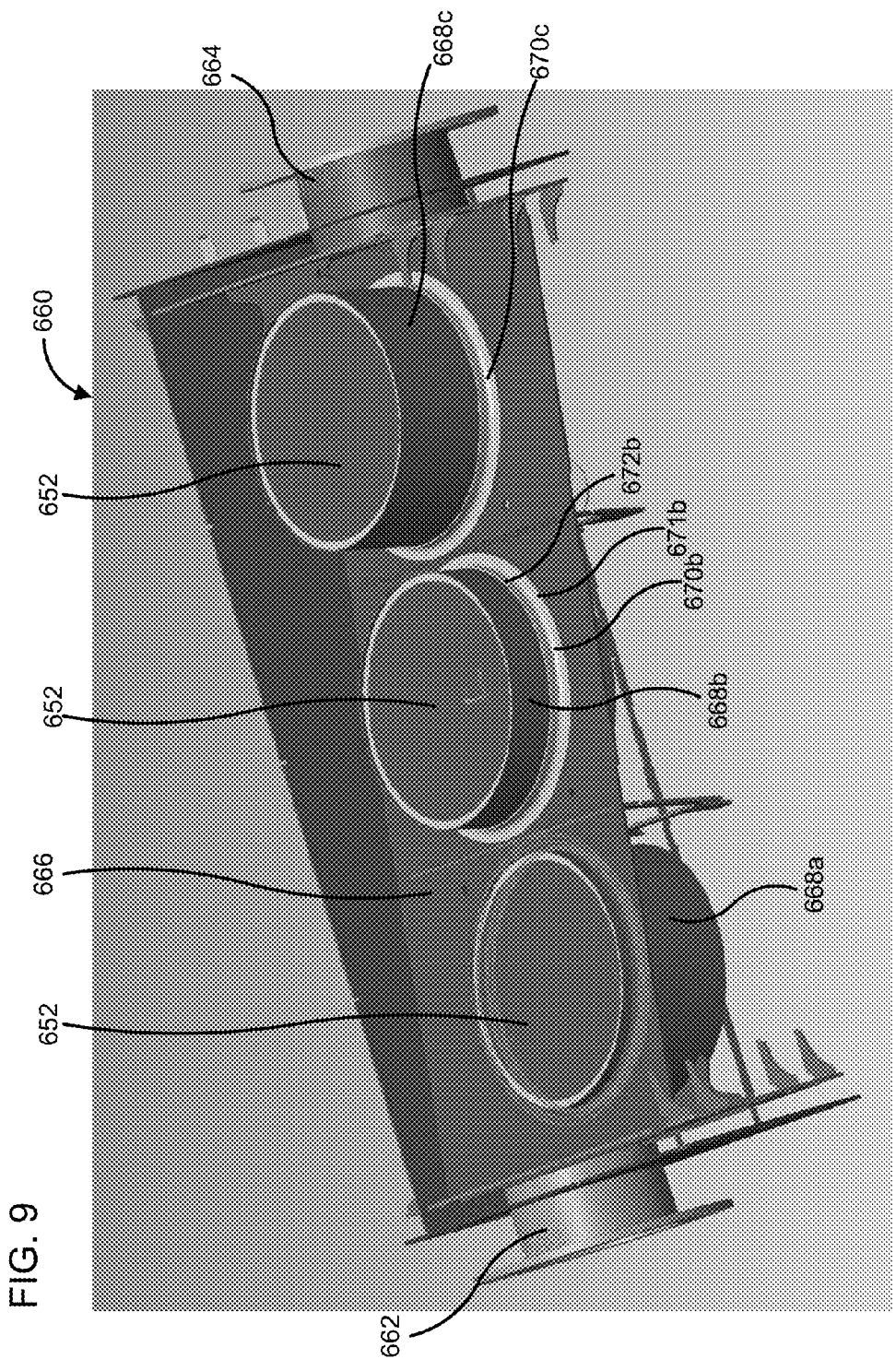
FIG. 9 is a perspective view of a catalyst assembly with a housing of the catalyst assembly removed. The catalyst assembly includes a plurality of catalyst substrate cans positioned within a flat plate of the catalyst assembly and a strengthening member positioned about a portion of each catalyst substrate can abutting the flat plate and fixedly coupled to the flat plate.
Figure 10:
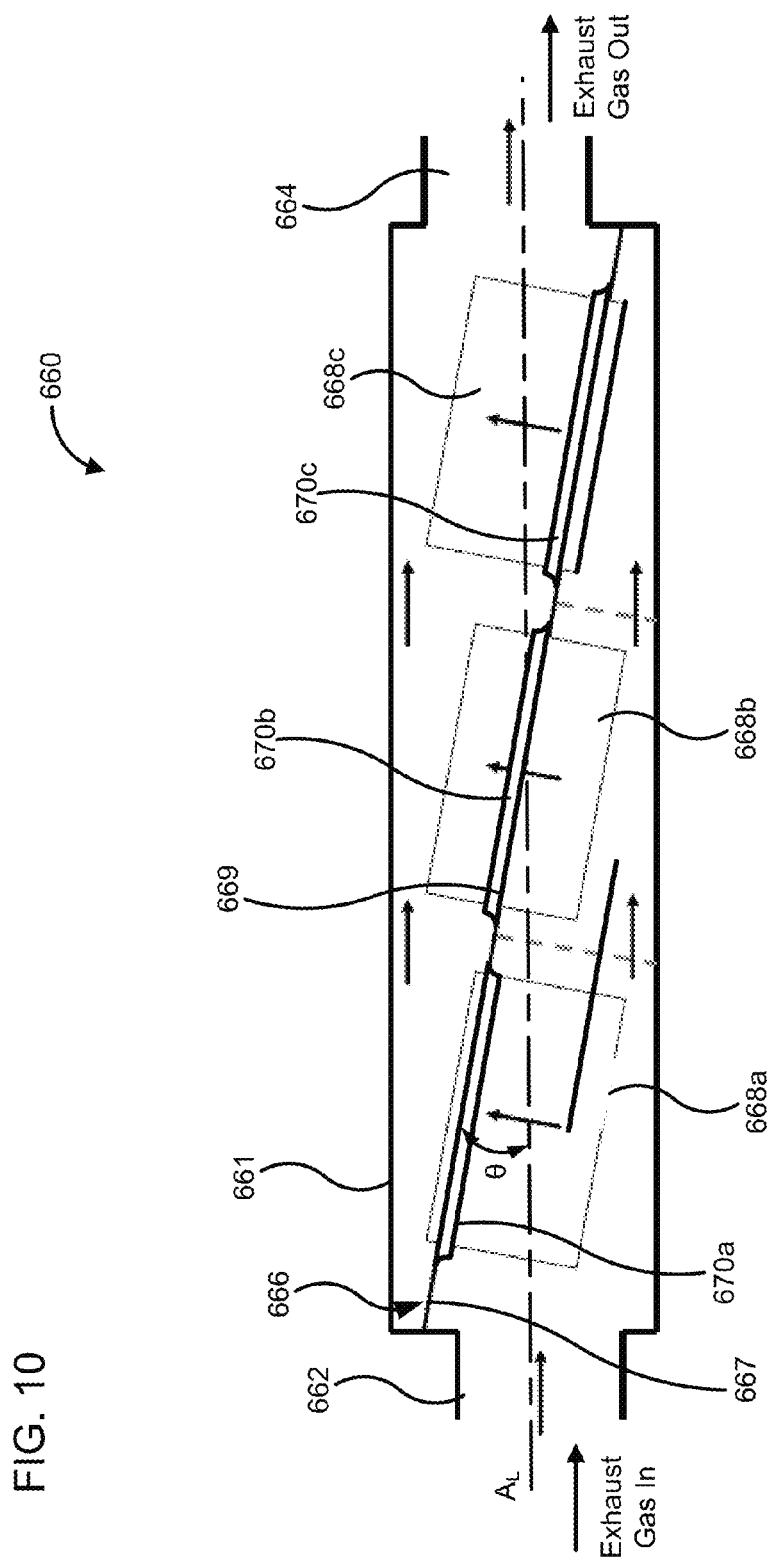
FIG. 10 is a side cross-section of the catalyst assembly of FIG. 9.

For example, FIGS. 9 and 10 show a catalyst system 660 according to an embodiment. The catalyst system 660 includes a housing 661, a plate 666, a first catalyst substrate can 668a, a second catalyst substrate can 668b and a third catalyst substrate can 668c (collectively referred to herein as "the catalyst substrate cans 668"), a first strengthening ring 670a, a second strengthening ring 670b and a third strengthening ring 670c (collectively referred to herein as "the strengthening rings 670").

The housing 661 includes an inlet 662 an outlet 664 and defines an internal volume. The housing 661 is configured to receive an exhaust gas (e.g., a diesel exhaust gas) via the inlet 662 which is communicated to the catalyst substrate cans 670 to decompose constituents (e.g., CO, unburnt hydrocarbons, ammonia or NOx gases) of the exhaust gas or treat the exhaust gas. The treated exhaust gas is expelled into the environment via the outlet 664.

The plate 666 is fixedly positioned (e.g., welded) within the internal volume of the housing 661. As shown in FIGS. 9 and 10, the plate 666 is substantially flat. As used herein, the term "substantially flat" means that it is possible for de minimus surface features, for example bumps, pits, contours and the likes to be present on the surface of the mounting plate 666 due to imperfections in any forming process used to form the plate 666 as would be understood by one of ordinary skill in the art. The plate 666 is inclined with respect to a longitudinal axis $A_L$ of the housing 661. As shown in FIGS. 9 and 10, a first end of the plate 666 is coupled (e.g., fixedly coupled) proximal to the inlet 662 and a second end of the plate 666 is coupled (e.g., fixedly coupled) proximal to the outlet 664 so that the plate 666 is inclined at an angle θ relative to the longitudinal axis $A_L$ and, thereby a direction of exhaust gas flow. A plurality of openings are defined in the plate 666. Each of the catalyst substrate cans 670 is positioned through an opening of the plurality of openings such that the catalyst substrate cans 670 are also inclined at the angle θ and, thereby a direction of exhaust gas flow. In various embodiments, the plate 666 can be contoured or curved.

The catalyst substrate cans 670 include a hollow cylinder containing a catalyst assembly 652 (e.g., a diesel oxidation catalyst assembly, an ammonia oxidation catalyst assembly or a NOx reduction catalyst assembly) positioned therewithin. FIGS. 9 and 10 show the catalyst substrate cans 668 as having a circular cross-section. In other embodiments, the catalyst substrate cans 668 can have any suitable cross-section, for example square, rectangular, elliptical, triangular, polygonal, etc. In such embodiments, the openings defined in the plate 666 can be shaped to mate or match with the cross-section of the corresponding catalyst substrate can 668.

The catalyst assembly 652 can include at least one catalyst formulated to decompose constituents of the exhaust gas as described herein. The catalyst can include any suitable catalyst such as, for example, platinum, palladium, rhodium, cerium, iron, manganese, copper, vanadium based catalyst, any other suitable catalyst, or a combination thereof.

The catalyst can be disposed on a suitable substrate such as, for example, a ceramic (e.g., cordierite) or metallic (e.g., kanthal) monolith core which can, for example, define a honeycomb structure. A washcoat can also be used as a carrier material for the catalyst. Such washcoat materials can include, for example, aluminum oxide, titanium dioxide, silicon dioxide, any other suitable washcoat material, or a combination thereof. The exhaust gas (e.g., diesel exhaust gas) can flow over and through the catalyst assembly 652 positioned in each catalyst substrate can 668 such that any CO, unburnt hydrocarbons, ammonia and/or NOx gases included in the exhaust gas are further reduced to yield an exhaust gas which is substantially free of such constituents.

The first strengthening ring 670a is positioned around an outer perimeter of the first catalyst substrate can 668a at a location proximal to a first surface 667 of the plate 666. The first strengthening plate 670a can abut the first surface 667 of the plate 666 and is fixedly coupled (e.g., welded) to the first catalyst substrate can 668a as well as the first surface 667 of the plate 666. The second strengthening ring 670b is positioned around an outer perimeter of the second catalyst substrate can 668b at a location proximal to a second surface 669 of the plate 666. The second strengthening plate 670b can abut the second surface 669 of the plate 666 and is fixedly coupled (e.g., welded) to the second catalyst substrate can 668b as well as the second surface 669 of the plate 666. Similarly, the third strengthening ring 670c is positioned around an outer perimeter of the third catalyst substrate can 668c at a location proximal to the second surface 669 of the plate 666 and is fixedly coupled (e.g., welded) to the third catalyst substrate can 668c as well as the second surface 669 of the plate 666.

Each of the strengthening rings 670 include a first portion positioned parallel to the plate 666 and a second portion positioned parallel to the perimeter of the corresponding catalyst substrate can 668. For example, as shown in FIG. 9, the second strengthening ring 668b includes a first portion 671b which is positioned parallel to the second surface 669 of the plate 666. The second strengthening ring 670b also includes a second portion 672b extending orthogonally (e.g., at an angle of 80 degrees, 85 degrees, 90 degrees, 95 degrees or 100 degrees inclusive of all ranges and values therebetween) from the first portion 671b such that the second portion 672b is parallel to the outer perimeter of the catalyst substrate can 668. In other word, the strengthening rings 670 have an L-shaped cross-section. The L-shaped cross-section may provide mechanical strength, stiffness and rigidity to the strengthening rings 670 while also facilitating coupling (e.g., welding) of the strengthening rings 670 to the flat plate 666.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

What is claimed is:

1. An aftertreatment system, comprising:
   a housing defining an inlet, and outlet and an internal volume, the housing including:
   a first sidewall,
   a sleeve positioned within the internal volume and protruding through the first sidewall,
   an inner shell positioned within an inner region defined by the sleeve, the inner shell defining a recess therein, the inner shell spaced apart from the sleeve so as to define a channel therebetween, and
   a base positioned within the recess, the base including an injection port, the injection port in fluidic communication with the internal volume;
   an injector disposed on the base, the injector disposed completely within the recess, the injector in fluidic communication with the internal volume via the injection port, the injector configured to inject an exhaust reductant into the internal volume via the injection port; and
   a selective catalytic reductant system disposed in the internal volume and structured to receive a mixture of an exhaust gas and the exhaust reductant, the selective catalytic reduction system including at least one catalyst formulated to treat the exhaust gas.

2. The aftertreatment system of claim 1, wherein an insulating material is positioned in the channel.

3. The aftertreatment system of claim 1, wherein a cover plate is disposed over the recess, the cover plate structured to prevent objects from impacting the injector.

4. The aftertreatment system of claim 3, wherein a plurality of openings are defined in the cover plate.

5. The aftertreatment system of claim 1, wherein the recess has a circular cross-section.

6. The aftertreatment system of claim 1, wherein the injector includes a base plate, the base plate removably coupled to the base of the recess via at least one fastener.

7. The aftertreatment system of claim 6, wherein a handle is disposed on the base plate, the handle structured to be engaged by a user to either selectively dispose the injector in the recess or selectively remove the injector from the recess.

8. The aftertreatment system of claim 1, wherein the inlet includes an inlet conduit and the outlet includes an outlet conduit, each of the inlet conduit and the outlet conduit rotatable relative to a longitudinal axis of the housing between a first position, in which the inlet conduit and the outlet conduit are oriented parallel to the longitudinal axis, and a second position, in which the inlet conduit and outlet conduit are oriented orthogonal to the longitudinal axis.

9. The aftertreatment system of claim 1, wherein the housing further comprises:
a second sidewall positioned orthogonal to the first sidewall, and
a third sidewall positioned orthogonal to the first sidewall and opposite the second sidewall,
wherein at least one of the second sidewall and the third sidewall define a plurality of mounting holes, each of the plurality of mounting holes configured to receive a fastener for mounting the housing on a structure.

10. The aftertreatment system of claim 1, wherein the inlet includes an inlet conduit and the outlet includes an outlet conduit, each of the inlet conduit and the outlet conduit configured to rotate relative to a longitudinal axis of the housing between a first position, in which the inlet conduit and outlet conduit are oriented parallel to the longitudinal axis, and a second position, in which the inlet conduit and the outlet conduit are oriented perpendicular to the longitudinal axis.

11. A housing for an aftertreatment system, comprising:
an inlet;
an outlet;
a first sidewall defining a recess therein, the recess comprising an opening defined in the sidewall, and a hollow cylinder disposed through the opening, the hollow cylinder having a first end; and
a base positioned within the recess, the base including an injection port, the injection port in fluidic communication with an internal volume defined by the housing, based coupled to the first end of the hollow cylinder to define a recess separate from the internal volume of the housing,
wherein the recess is structured to receive an injector such that the injector is disposed completely within the recess and is in fluidic communication with the internal volume of the housing via injection port, the injector configured to inject an exhaust reductant into the internal volume via the injection port,
wherein at least a portion of the first sidewall of the housing is contoured to define a dome shape.

12. The housing of claim 11, wherein the housing further comprises a second sidewall of the housing opposite the first sidewall,
wherein the second sidewall is also contoured so as to define the dome shape.

13. The housing of claim 12, wherein a plurality of ribs are defined on at least one of the first sidewall and the second sidewall.

14. The housing of claim 11, wherein the recess is defined proximal to the inlet.

15. The housing of claim 11, further comprising:
a cover plate disposed over the recess, the cover plate structured to prevent objects from impacting the injector.

16. The housing of claim 15, wherein a plurality of openings are defined in the cover plate.

17. The housing of claim 11, wherein the injector includes a base plate, the base plate removably coupled to the base of the recess via at least one fastener.

18. The housing of claim 17, wherein a handle is disposed on the base plate, the handle structured to be engaged by a user to selectively dispose the injector in the recess and selectively remove the injector from the recess.

19. A housing for an aftertreatment system, comprising:
an inlet;
and outlet;
a first sidewall defining a recess therein; and
a base positioned within the recess, the base including an injection port, the infection port in fluidic communication with an internal volume defined by the housing,
wherein the recess is structured to receive an injector suck that the injector is disposed completely within the recess and is in fluidic communication with the internal volume via the injection port, the injector configured to inject an exhaust reductant into the internal volume via the injection port;
a sleeve positioned within the internal volume and protruding through the first sidewall; and
an inner shell positioned within an inner region defined by the sleeve, the inner shell defining the recess therein, the inner shell spaced apart from the sleeve so as to define a channel therebetween,
wherein at least a portion of the first sidewall of the housing is contoured to define a dome shape.

20. An apparatus for treating an exhaust gas, comprising:
a housing defining an internal volume and including:
an inlet conduit,
an outlet conduit,
a first sidewall defining a recess therein, and
a base positioned within the recess, the base including an injection port, the injection port in fluidic communication with the internal volume;
an injector disposed on the base of the recess, the injector disposed completely within the recess, the injector in fluidic communication with the internal volume via the injection port, the injector configured to inject an exhaust reductant into the internal volume via the injection port; and
a cover plate disposed over the recess, the cover plate structured to prevent objects from impacting the injector,
wherein each of the inlet conduit and the outlet conduit are rotatable relative to a longitudinal axis of the housing between a first position, in which the inlet conduit and the outlet conduit are oriented parallel to the longitudinal axis, and a second position, in which the inlet conduit and the outlet conduit are oriented perpendicular to the longitudinal axis.

21. The apparatus of claim 20, wherein the injector includes a base plate, the base plate removably coupled to the base of the recess via at least one fastener.

22. The apparatus of claim 21, wherein a handle is disposed on the base plate, the handle structured to be engaged by a user to selectively dispose the injector in the recess and selectively remove the injector from the recess.

23. The apparatus of claim 20, wherein the housing further comprises:
a sleeve positioned within the internal volume and protruding through the first sidewall; and
an inner shell positioned within an inner region defined by the sleeve, the inner shell defining the recess therein, the inner shell spaced apart from the sleeve so as to define a channel therebetween.

24. The apparatus of claim 20, wherein at least a portion of the first sidewall of the housing is contoured so as to define a dome shape.

25. The apparatus of claim 20, wherein the housing further comprises:
a second sidewall positioned orthogonal to the first sidewall; and
a third sidewall positioned orthogonal to the first sidewall and opposite the second sidewall,
wherein at least one of the second sidewall and the third sidewall define a plurality of mounting holes, each of the plurality of mounting holes configured to receive a fastener for mounting the housing on a structure.

26. A catalyst system, comprising:
a housing including an inlet, an outlet and defining an internal volume;
a plate positioned within the housing, the plate including a first end positioned proximal to the inlet and a second end positioned proximal to the outlet, the plate inclined from the first end to the second end at a predetermined angle relative to a longitudinal axis of the housing, at least one opening defined in the plate, the plate being substantially flat;
a cylindrical catalyst substrate can positioned in the at least one opening, the catalyst substrate can containing a catalyst assembly therewithin; and
a strengthening ring positioned around an outer perimeter of the catalyst substrate can, the strengthening ring located proximal to a surface of the plate and fixedly coupled to each of the plate and the catalyst substrate can.

27. The catalyst system of claim 26, wherein the strengthening includes:
a first portion positioned parallel to the surface of plate, and
a second portion extending orthogonally away from the first portion such that the second portion is positioned parallel to the outer perimeter of the catalyst substrate can.

* * * * *